U S010401179B2

(12) United States Patent
Weinfield

(10) Patent No.: US 10,401,179 B2
(45) Date of Patent: Sep. 3, 2019

(54) GNSS AND GPS INACCURACY DETECTION METHOD FOR URBAN ENVIRONMENTS

(71) Applicants: DENSO International America, Inc., Southfield, MI (US); DENSO CORPORATION, Kariya, Aichi-pref. (JP)

(72) Inventor: Aaron D. Weinfield, Encinitas, CA (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 69 days.

(21) Appl. No.: 15/384,913

(22) Filed: Dec. 20, 2016

(65) Prior Publication Data

US 2018/0172453 A1 Jun. 21, 2018

(51) Int. Cl.
| G01C 21/28 | (2006.01) |
| G01S 19/46 | (2010.01) |
| G01S 19/39 | (2010.01) |
| G01C 21/36 | (2006.01) |

(52) U.S. Cl.
CPC ......... *G01C 21/28* (2013.01); *G01C 21/3697* (2013.01); *G01S 19/39* (2013.01); *Y02T 10/84* (2013.01)

(58) Field of Classification Search
CPC ................................ G01C 21/28; G01S 19/46
See application file for complete search history.

(56) References Cited

U.S. PATENT DOCUMENTS

| 4,837,700 A | 6/1989 | Ando et al. | |
| 6,862,083 B1 * | 3/2005 | McConnell, Sr. ... | A01B 79/005 356/4.01 |
| 2011/0184605 A1 * | 7/2011 | Neff ..................... | G05D 1/0231 701/25 |
| 2015/0210284 A1 * | 7/2015 | Miyashita ............. | B60W 40/04 701/117 |

FOREIGN PATENT DOCUMENTS

| JP | S63109381 A | 5/1988 |
| JP | H03023488 A | 1/1991 |
| JP | 2009110093 A | 5/2009 |
| JP | 2015141560 A | 8/2015 |
| JP | 2015171851 A | 10/2015 |

* cited by examiner

*Primary Examiner* — Anshul Sood
(74) *Attorney, Agent, or Firm* — Harness, Dickey & Pierce, P.L.C.

(57) ABSTRACT

A system for detecting inaccuracies in a global network satellite system receiver or a global positioning system receiver within a vehicle includes a global network satellite system receiver or a global positioning system receiver, an average position and standard deviation determination unit, an inaccuracy determination unit, and a vehicle controller. The global network satellite system receiver or global positioning system receiver receives a signal indicating a current position of a vehicle. The average position and standard deviation determination unit determines an average position and a standard deviation for a position of the vehicle. The inaccuracy determination unit determines whether the standard deviation for the position is greater than a standard deviation threshold. The vehicle controller adjusts safety applications of one of the vehicle or a remote vehicle if the standard deviation for the position is greater than the standard deviation threshold.

20 Claims, 5 Drawing Sheets

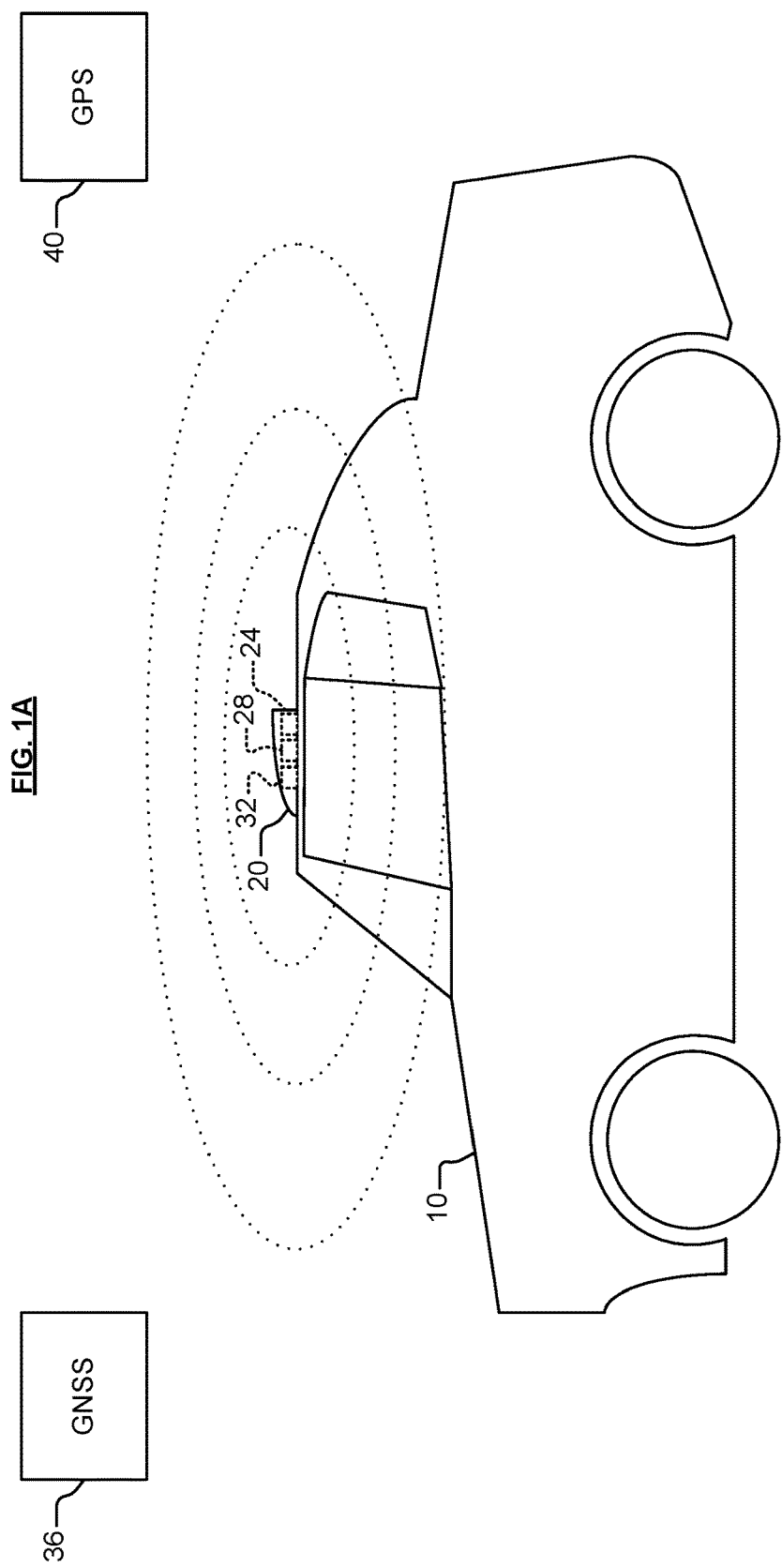

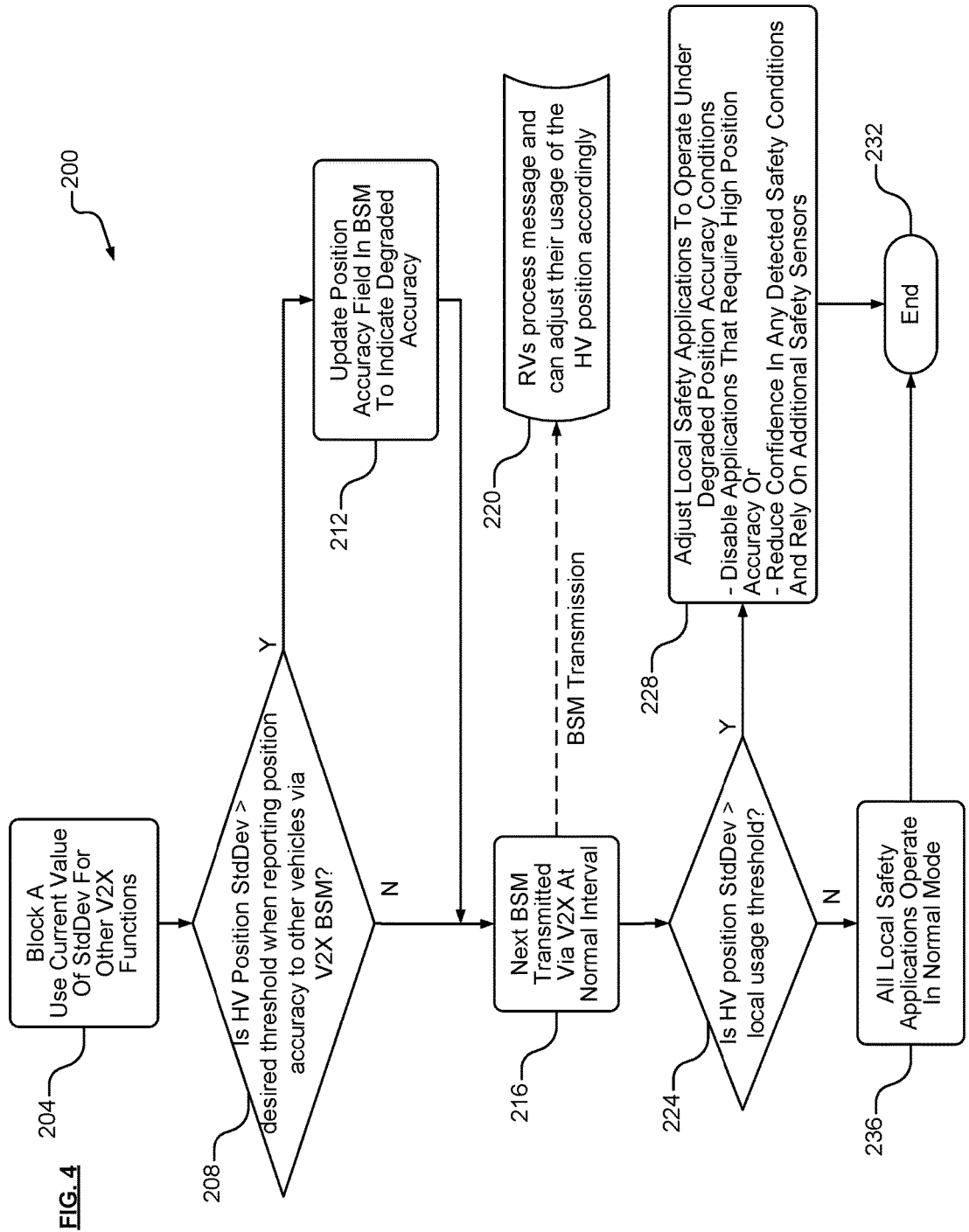

GNSS AND GPS INACCURACY DETECTION METHOD FOR URBAN ENVIRONMENTS

FIELD

The present disclosure relates to dedicated short range communication (DSRC) systems and, in particular, to detecting inaccuracies in data provided from Global Network Satellite Systems (GNSS) and Global Positioning Systems (GPS) particularly in urban environments.

BACKGROUND

This section provides background information related to the present disclosure which is not necessarily prior art.

Vehicle-to-vehicle and vehicle-to-infrastructure (collectively referred to as V2X) safety technology relies on a host vehicle receiving messages via a dedicated short range communication (DSRC) system from at least one remote vehicle. DSRC technology relies heavily on Global Network Satellite Systems (GNSS) and Global Positioning Systems (GPS), along with Basic Safety Messages (BSM) periodically transmitted by vehicles containing the current vehicle position, position accuracy, speed, heading, brake status, and other vehicle information. With V2X technology, vehicles can have improved safety by knowing more about the other surrounding vehicles.

GNSS and GPS receivers claim to have a certain level of accuracy and often do in open-sky environments. For example, in open-sky environments, GNSS and GPS receivers achieve measurements within at least 1.5 meters (m) of accuracy. However, GNSS and GPS receivers are often less accurate in urban canyons such as cities that have very tall buildings, due to poor clear sky view and a high multi-path radio frequency (RF) signal environment. Unfortunately, the information provided from the GNSS and GPS receiver that is intended to indicate the level of accuracy does not always provide a good indication of the actual accuracy in the current situation. Some of the parameters used to provide GNSS and GPS accuracy within the National Marine Electronics Association (NMEA) 0183 standards include the Dilution of Precision information (horizontal dilution of precision—HDOP, vertical dilution of precision—VDOP, position dilution of precision—PDOP), error ellipse estimation information, and latitude/longitude error estimations. In some situations, the GNSS and GPS devices report an "accuracy" value that implies the position accuracy is better than the actual accuracy.

As such, there is a need to address the issue of accuracy in the GNSS and GPS systems. Improved safety can be achieved by ensuring that all V2X devices have an accurate understanding of the current GNSS and GPS accuracy in the given situation.

SUMMARY

This section provides a general summary of the disclosure, and is not a comprehensive disclosure of its full scope or all of its features.

A system for detecting inaccuracies in a global network satellite system receiver or a global positioning system receiver within a vehicle includes a global network satellite system receiver or a global positioning system receiver, an average position and standard deviation determination unit, an inaccuracy determination unit, and a vehicle controller. The global network satellite system receiver or global positioning system receiver receives a signal from a global network satellite system or a global positioning system indicating a current position of a vehicle. The average position and standard deviation determination unit receives the current position of the vehicle from the global network satellite system receiver or the global positioning system receiver and determines an average position and a standard deviation for a position of the vehicle. The inaccuracy determination unit determines whether the standard deviation for the position is greater than a standard deviation threshold. The vehicle controller adjusts safety applications of one of the vehicle or a remote vehicle if the standard deviation for the position is greater than the standard deviation threshold.

The system may further include a current speed and position determination unit that receives signals from the global network satellite system receiver or the global positioning system receiver and a control area network of the vehicle and determines the current position of the vehicle and the current speed of the vehicle from the signals.

The system may further include a dedicated short range communication system on the vehicle in communication with the inaccuracy determination unit that updates a basic safety message broadcast to the remote vehicle if the standard deviation for the position is greater than a standard deviation threshold.

The system may further include a dedicated short range communication system on the vehicle that communicates with a dedicated short range communication system of the remote vehicle to transmit the basic safety message having an updated position accuracy field.

The system may further include a dedicated short range communication system on the vehicle that communicates with the inaccuracy determination unit and the vehicle controller to indicate when the standard deviation of the position is greater than a local usage threshold.

The system may further include a vehicle controller that disables applications, reduces a confidence value, or activates safety sensors when the standard deviation of the position is greater than the local usage threshold.

A method for detecting inaccuracies in a global network satellite system receiver or a global positioning system receiver includes determining, with an average position and standard deviation determination unit, an average position and a standard deviation for a position of a vehicle; determining, with an inaccuracy determination unit, whether the standard deviation for the position is greater than a standard deviation threshold; and adjusting, with a vehicle controller, safety applications of one of the vehicle or a remote vehicle if the standard deviation for the position is greater than the standard deviation threshold.

The method may further include determining, with a current speed and position determination unit, a current speed and a current latitude, longitude, and elevation position of the vehicle, wherein the current latitude, longitude, and elevation positions are determined based on signals received from a global positioning system receiver or a global network satellite systems receiver.

The method may further include determining the current speed of the vehicle based on a signal received from a control area network in the vehicle.

The method may further include determining, by the average position and speed determination unit, whether the vehicle is moving based on whether the current speed of the vehicle is greater than zero.

The method may further include determining, by the average position and speed determination unit, whether a previous vehicle speed is greater than zero.

The method may further include resetting, with the average position and standard deviation determination unit, the average position and standard deviation of the position to zero if the previous vehicle speed is greater than zero.

The method may further include determining, with the average position and standard deviation determination unit, an updated average position and standard deviation of the position using a current vehicle speed and a current vehicle position if the previous vehicle speed is not greater than zero.

The method may further include determining, with the average position and standard deviation determination unit, whether the vehicle is in an urban environment based on a distance driven or time driven since the vehicle was last stopped.

The method may further include resetting, with the average position and standard deviation determination unit, the average position and standard deviation of the position to zero if the vehicle is in the urban environment.

The method may further include determining, with a dedicated short range communication system, an updated position accuracy field if the standard deviation for the position is greater than the standard deviation threshold.

The method may further include transmitting, with a dedicated short range communication system, a basic safety message having a current position of the vehicle, a current speed of the vehicle, and the updated position accuracy field to a dedicated short range communication system of the remote vehicle.

The method may further include adjusting, by the remote vehicle, a usage of the current position and the current speed of the vehicle based on the updated position accuracy field.

The method may further include determining, with the vehicle controller, whether the standard deviation of the position is greater than a local usage threshold.

The method may further include disabling applications, reducing a confidence level, or activating safety sensors if the standard deviation of the position is greater than the local usage threshold.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A is an illustration of a vehicle including systems for detecting inaccuracies in a Global Network Satellite System (GNSS) receiver and/or a Global Positioning System (GPS) receiver according to the present teachings.

FIG. 4 illustrates a flow diagram for a method according to the present teachings for reporting an accuracy or inaccuracy in the GNSS receiver and/or GPS receiver of the vehicle.

Corresponding reference numerals indicate corresponding parts throughout the several views of the drawings.

DETAILED DESCRIPTION

Figure 1B:
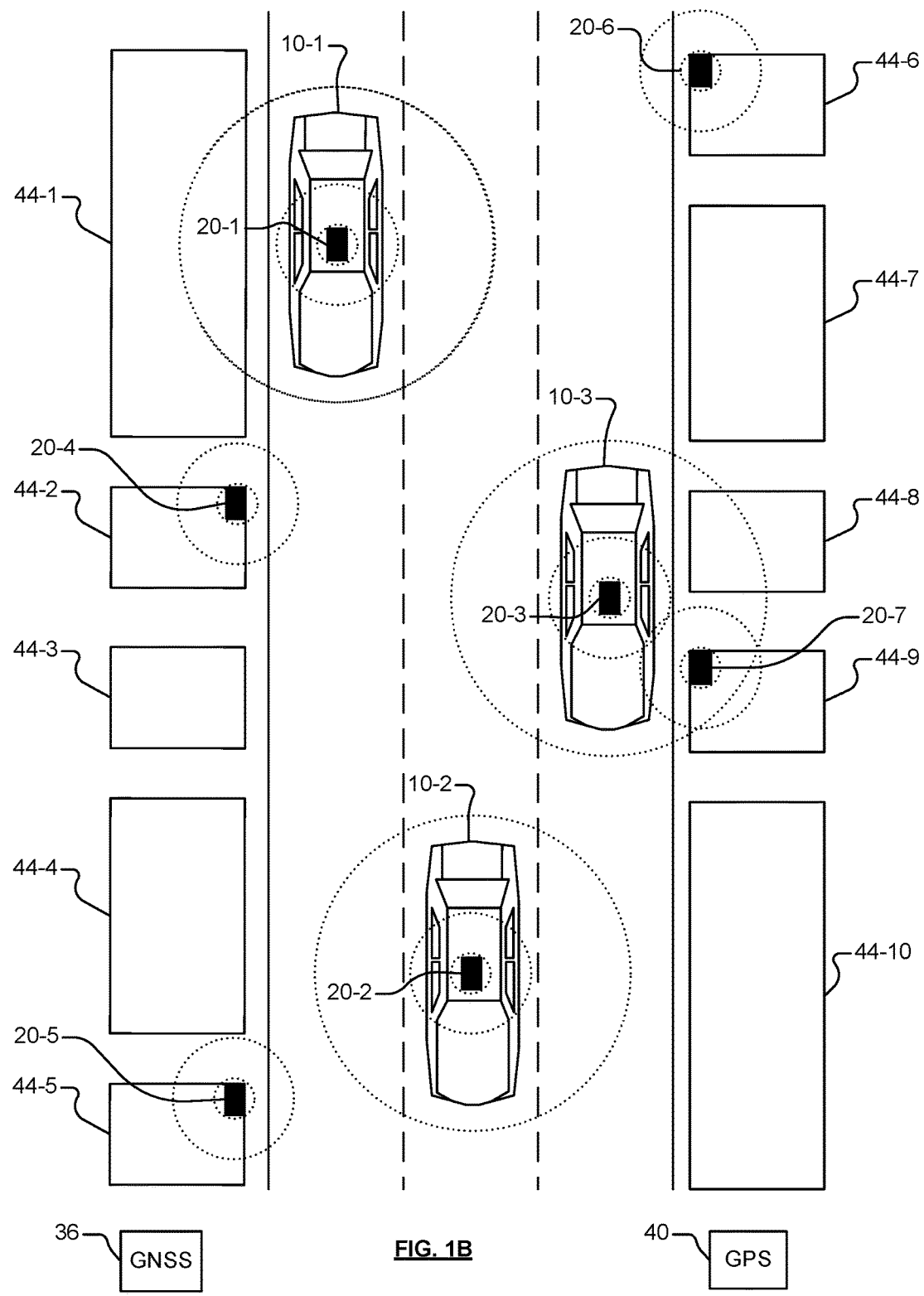
FIG. 1B is an illustration of several vehicles having DSRC systems with systems for detecting inaccuracies in the GNSS receiver and/or GPS receiver in an urban environment according to the present teachings.

Example embodiments will now be described more fully with reference to the accompanying drawings.

With reference to FIG. 1A, a vehicle with V2X safety technology is shown. In the example embodiment, a vehicle, or host vehicle, 10 is equipped with a DSRC system 20 having a Global Network Satellite System (GNSS) receiver 24 and/or a Global Positioning System (GPS) receiver 28 and a GNSS and GPS inaccuracy detection system 32. The DSRC system 20 may be configured to transmit and receive signals representing, for example, early warnings of accidents and driving hazards to/from remote vehicles that are also equipped with V2X systems and/or to/from an infrastructure communication location equipped with a V2X system. Additionally, the DSRC system 20 may be configured to predict future accidents and driving hazards based on communication with remote vehicles and/or infrastructure communication locations that are also equipped with V2X systems by calculating the current and future positions of the vehicle 10.

The DSRC system 20 may also be configured to improve a fuel efficiency of the vehicle 10. The DSRC system 20 may be configured to communicate to an operator of the vehicle 10 a timing of a traffic signal, thereby allowing the operator to optimize fuel efficiency and perform time-saving driving habits. As an example, the DSRC system 20 may be configured to communicate with the traffic signal and alert the operator as to how much time he or she has until the light will change from a red light to a green light, a green light to a yellow light, or a yellow light to a red light. As another example, the DSRC system 20 may instruct the operator to operate the vehicle at a certain speed in order to avoid being stopped by a red light on a traffic route.

The DSRC system 20 may rely on Global Network Satellite Systems (GNSS) 36 and/or Global Positioning Systems (GPS) 40, which communicate with the GNSS receiver 24 and/or GPS receiver 28, along with Basic Safety Messages (BSM) periodically transmitted by other vehicles and/or infrastructure containing the current position, position accuracy, speed, heading, brake status, and other vehicle and/or infrastructure information. With V2X technology, vehicles can have improved safety by knowing more about the other surrounding vehicles and infrastructure.

The DSRC system 20 may communicate with the other vehicles or infrastructure equipped with a V2X system by using a 75 MHz band around a 5.9 GHz signal. All of the components of the DSRC system 20 may be located at one or multiple locations on the roof of the vehicle. Alternatively, some of the components may be located in the interior of the vehicle 10. While the DSRC system 20 is illustrated as being located on the roof of the vehicle 10, in some embodiments, the DSRC system 20, and any or all of its components, may be disposed at any location on the vehicle 10 to include the front, rear, and sides of the vehicle 10.

With reference to FIG. 1B, a plurality of vehicles and infrastructure with V2X safety technology is shown. In the example embodiment, vehicles, or remote vehicles, 10-1, 10-2, 10-3 (collectively referred to as vehicles 10) are respectively equipped with DSRC systems 20-1, 20-2, 20-3

(collectively referred to as DSRC systems 20). Infrastructures 44-1, 44-2, . . . 44-10 (collectively referred to as infrastructures 44) may or may not include DSRC systems. For example, a portion of infrastructures 44 may include DSRC systems 20-4, 20-5, . . . 20-7 (included with the collective DSRC systems 20). The DSRC systems 20 may operate in both line-of-sight (LOS) and non-line-of-sight (NLOS) conditions, thereby allowing the DSRC systems 20 of the vehicles 10 and infrastructures 44 to communicate warnings and driving hazards, even with blockage from intervening vehicles, blind corners, or other roadside infrastructure. DSRC signals from each of the DSRC systems 20 are illustrated radiating outward in a circular pattern, as indicated by dotted circles in FIG. 1B.

In some situations, the DSRC signal coverage around the vehicle 10 or infrastructure 44 may be non-circular. Thus, the effective link range between the vehicles 10 and infrastructures 44 may be reduced in certain directions and may ultimately impair the delivery of alerts and warnings. For example, the link range may be degraded or reduced based on the shape of a vehicle body and blockage from the curved roof; the use of metals, nonmetals, and/or glass on the vehicle body; roof blockage, including racks, bags, luggage carriers, etc.; the sizes, locations, and number of antennas; interference from other wireless antenna elements, such as LTE/cellular interference; and weaker coverage below the vehicle's horizon. However, these factors may be mitigated by the implementation of a dual-chain transmit (Tx) and diversity receive (Rx) mode; antenna elements positioned on the glass, headliner, plastic, and/or other surface of the vehicle in addition to antenna elements located on the roof; additional amplifiers in a Tx/Rx signal path; and low-loss radio frequency (RF) cable assemblies that connect antennas to optional amplifiers or to the DSRC radio.

Additionally, in urban environments, such as the one pictured in FIG. 1B, buildings and other infrastructure may block a clear sky view, and along with a high multi-path radio frequency (RF) signal environment, may impair the accuracy of the GNSS 36 and GPS 40 signal readings in the GNSS receiver 24 and/or GPS receiver 28 in the DSRC systems 20 in the vehicles 10 and infrastructure 44.

Figure 2:
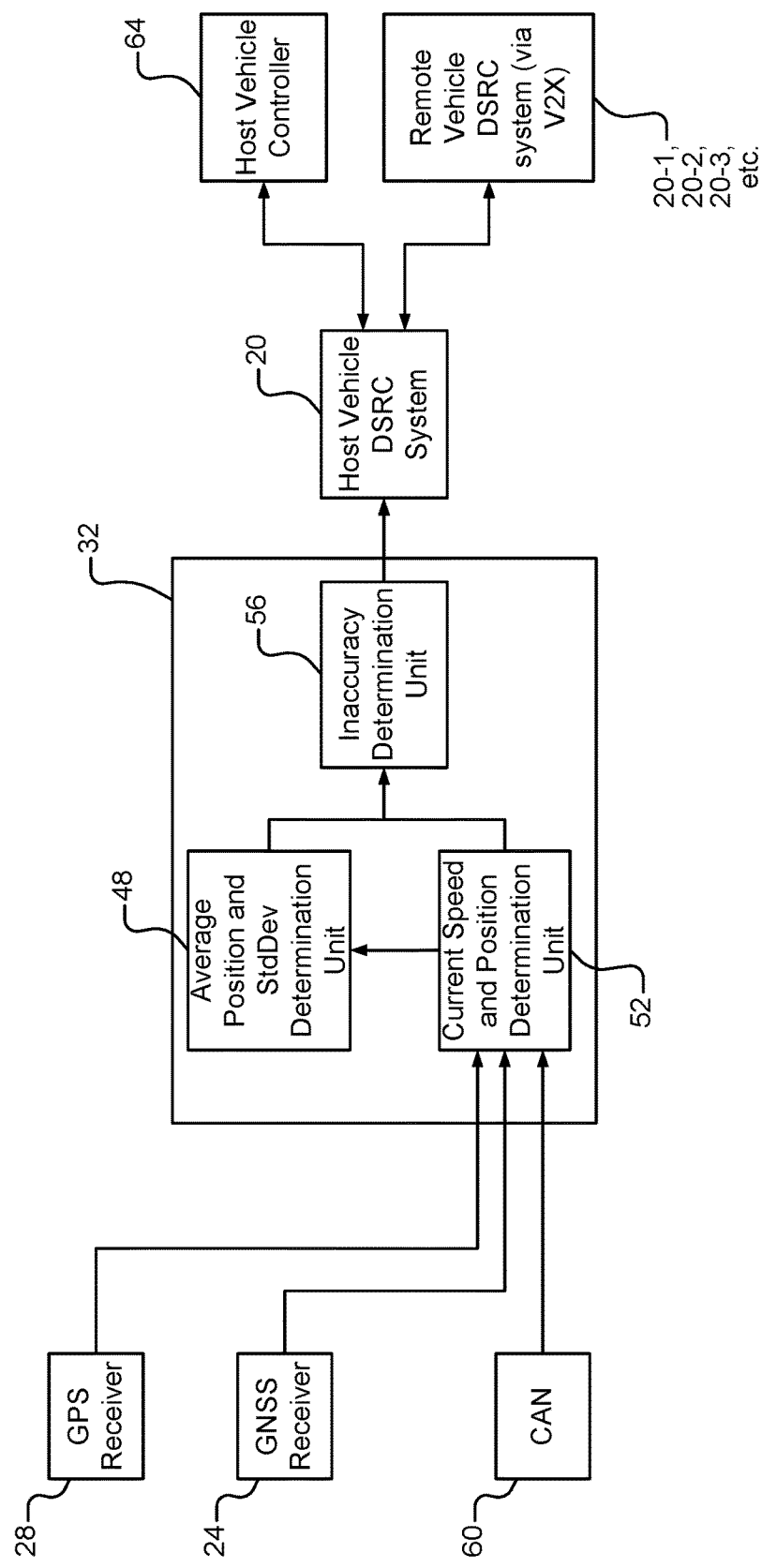
FIG. 2 illustrates a block diagram of a system according to the present teachings for detecting inaccuracies in the GNSS receiver and/or GPS receiver.

Referring to FIG. 2, the GNSS and GPS inaccuracy detection system 32 detects when a vehicle's GNSS or GPS device is likely to be less accurate than desired, such as in the city or urban environment depicted in FIG. 1B. The DSRC system 20 in the vehicle 10 can make use of this information and adapt the vehicle's 10 safety applications accordingly and advertise a degraded accuracy value to the surrounding DSRC systems 20.

The GNSS and GPS inaccuracy detection system 32 includes an average position and standard deviation determination unit 48, a current speed and position determination unit 52, and an inaccuracy determination unit 56. The current speed and position determination unit 52 may receive signals from the GPS receiver 28, the GNSS receiver 24 and a control area network (CAN) 60. The GPS receiver 28 may provide signals indicating vehicle position and time based on the GPS receiver's 28 communication with the GPS 40, and/or the GNSS receiver 24 may provide signals indicating vehicle position and time based on the GNSS receiver's 24 communication with the GNSS 36. The current speed and position determination unit 52 may receive a new position update every 10 hertz (Hz) or 100 milliseconds (ms) from the GPS and/or GNSS receivers 28, 24, but could receive a new position update at any rate. The position signal sent by the GPS and/or GNSS receivers 28, 24 contains position coordinates for a latitude, a longitude, and an elevation position of the vehicle 10, along with the time at which the latitude, longitude, and elevation coordinates were determined. The CAN 60 may provide various vehicle information, such as vehicle speed, accelerator pedal position, brake pedal position, and steering wheel position, for example.

The current speed and position determination unit 52 may use the information received from the GPS receiver 28, the GNSS receiver 24 and CAN 60 to determine the current speed and current position of the vehicle 10 (or host vehicle). For example, the current speed and position determination unit 52 may determine the vehicle position based on the latitude, longitude, and elevation coordinates for the vehicle 10 sent by the GPS and/or GNSS receivers 28, 24. The current speed and position determination unit 52 may determine the vehicle speed based on a calculation of the change position and change time (i.e., $\Delta position/\Delta time$) for two transmissions of the latitude, longitude, and elevation coordinates for the vehicle 10, or the current speed and position determination unit 52 may determine vehicle speed from the vehicle speed signal sent by the CAN 60.

The current speed and position determination unit 52 may communicate with the average position and standard deviation determination unit 48. For example, the current speed and position determination unit 52 sends signals to the average position and standard deviation determination unit 48 indicating the current position and speed of the vehicle 10. The average position and standard deviation determination unit 48 compares the current position and speed of the vehicle 10 to predetermined thresholds (for example, zero) to determine whether the vehicle is currently moving. For example, the average position and standard deviation determination unit 48 determines whether the current vehicle speed is greater than zero (0). A current vehicle speed equal to zero (or not greater than zero) indicates that the vehicle is stopped (not moving), and a current vehicle speed greater than zero indicates that the vehicle is currently moving.

The average position and standard deviation determination unit 48 retains the speed and position (along with the time determined) data sent from the current speed and position determination unit 52. The average position and standard deviation determination unit 48 compares previous vehicle position and speed data with predetermined thresholds to determine whether the vehicle was previously stopped or moving. For example, a previous vehicle speed equal to zero (or not greater than zero) indicates that the vehicle was previously stopped (not moving), and a previous vehicle speed greater than zero indicates that the vehicle was previously moving.

The average position and standard deviation determination unit 48 also determines the amount of time that the vehicle has been stopped or the amount of time that the vehicle has been moving. The average position and standard deviation determination unit 48 calculates the distance driven or the time since the vehicle started moving from all of the position and speed readings from the current speed and position determination unit 52 where the vehicle speed has consecutively been greater than zero. The average position and standard deviation determination unit 48 calculates the amount of time that the vehicle has been stopped from all of the position and speed readings from the current speed and position determination unit 52 where the vehicle speed has consecutively not been greater than zero (or when the vehicle speed has been equal to zero).

The average position and standard deviation determination unit 48 compares the distance driven or the amount of time time that the vehicle has been moving with a predetermined distance or time threshold and determines whether the distance driven or time since the vehicle started moving exceeds a predetermined distance or time threshold to indicate whether the vehicle 10 has left the urban environment. For example only, the threshold for the distance driven may be within the range of 800 meters (m) to 0.5 miles, and the threshold for the time moving may be within the range of 60 seconds (s) to 2 minutes (min). While the thresholds for distance driven and time moving may be 800 m-0.5 miles and 60 s-2 min, respectively, the thresholds may be customized for different urban environments or different cities and may be set to any threshold indicating that the vehicle 10 may have left the urban environment. Further, the average position and standard deviation determination unit 48 may utilize one or both of the distance and time thresholds to determine whether the vehicle 10 has left the urban environment.

The average position and standard deviation determination unit 48 further determines an average position and a standard deviation of the position for the vehicle 10. The average position is an average of all received vehicle position samples taken during a defined time period. For example, the average position and standard deviation determination unit 48 determines the average position of the vehicle 10 of all received vehicle position readings during the time when the vehicle 10 is stopped (or during the time when the vehicle speed is not greater than zero).

The standard deviation is a determination of the extent to which the position deviates from the group of position samples taken during the defined time period. For example, the average position and standard deviation determination unit 48 determines the standard deviation of the position of the vehicle 10 during the time when the vehicle is stopped. The formula for standard deviation is the square root of the mean of squared differences in the vehicle's position for the defined time period, as shown in the following equation:

$$\sigma = \sqrt{\frac{1}{N}\sum_{i=1}^{N}(x_i - \mu)^2}$$

where σ is the standard deviation, N is the total number of position samples taken during the defined time period, $x_i$ is the individual position samples taken during the defined time period, and μ is the mean of the position samples taken during the defined time period.

The average position and standard deviation determination unit 48 communicates with the inaccuracy determination unit 56. For example, the average position and standard deviation determination unit 48 sends signals indicating the average position and the standard deviation of the position to the inaccuracy determination unit 56. The inaccuracy determination unit 56 determines whether there are inaccuracies in the GNSS and/or GPS receiver 24, 28 data. For example, the inaccuracy determination unit 56 compares the host vehicle's 10 standard deviation received from the average position and standard deviation determination unit 48 to a predetermined threshold. For example only, the predetermined standard deviation threshold may be equal to 0.00001. While the threshold for standard deviation may be 0.00001, the threshold may be customized for different urban environments or the different latitude, longitude, and elevation positions, among other things. Thus, the threshold for standard deviation may be set to any threshold indicating that there are inaccuracies in the GNSS and/or GPS receiver 24, 28 data. A standard deviation that is greater than the standard deviation threshold may indicate that there are inaccuracies in the GNSS and/or GPS receiver 24, 28 data, while a standard deviation less than or equal to the standard deviation threshold (i.e. not greater than the standard deviation threshold) may indicate that there are no inaccuracies in the GNSS and/or GPS receiver 24, 28 data.

The inaccuracy determination unit 56 communicates with the host vehicle's 10 DSRC system 20. For example, the inaccuracy determination unit 56 may transmit signals indicating whether there is a degraded accuracy in the GNSS and/or GPS receiver 24, 28 data. For example, if the inaccuracy determination unit 56 determined that the standard deviation is greater than the standard deviation threshold, the inaccuracy determination unit 56 may send a signal to the host vehicle's 10 DSRC system 20 indicating that there are inaccuracies in the GNSS and/or GPS receiver 24, 28 data. If the inaccuracy determination unit 56 determined that the standard deviation is less than or equal to the standard deviation threshold (i.e. not greater than the standard deviation threshold), the inaccuracy determination unit 56 may send signals to the host vehicle's 10 DSRC system 20 indicating that there are no inaccuracies in the GNSS and/or GPS receiver 24, 28 data.

Based on the signals received from the inaccuracy determination unit 56, the host vehicle DSRC system 20 may transmit BSMs to remote vehicles' 10-1, 10-2, 10-3, etc., DSRC systems 20-1, 20-2, 20-3. For example, if the inaccuracy determination unit 56 determines that there are inaccuracies in the GNSS and/or GPS receiver 24, 28 data, the host vehicle DSRC system 20 updates the position accuracy field in the BSM to indicate a degraded accuracy in the GNSS and/or GPS receiver 24, 28 data at 212. For example, the BSM may be updated using the following equation:

DegradedAccuracyMeters=max(PosAccuracy,(((Pos$_{StdDev}$−K$_{StdDevThold}$)*C)+M))

where PosAccuracy is the position accuracy obtained directly from the positioning system via other conventional methods, Pos_StdDev is the HV standard deviation, K_StdDev_Thold is the standard deviation threshold, C is equal to 150000 and M is equal to 1.

Once the BSM position accuracy field is updated, the host vehicle DSRC system 20 transmits the next BSM to remote vehicle DSRC systems 20-1, 20-2, 20-3, etc., via V2X. A normal interval for transmission of the BSM via V2X is at 10 Hz, but may be at any interval.

If the inaccuracy determination unit 56 determines that there are no inaccuracies in the GNSS and/or GPS receiver 24, 28 data, the host vehicle DSRC system 20 transmits the next BSM to remote vehicle DSRC systems 20-1, 20-2, 20-3, etc., via V2X at a normal interval without any update to the position accuracy field.

Remote vehicle DSRC systems 20-1, 20-2, 20-3, etc., process the BSM message transmitted via V2X can adjust the remote vehicles' usage of the host vehicle's position accordingly. For example, the remote vehicle DSRC systems 20-1, 20-2, 20-3, etc., may disable systems or functions relying on the host vehicle's position, the remote vehicle DSRC systems 20-1, 20-2, 20-3, etc., may rely on other sensors to determine the host vehicle's position, and/or the remote vehicle DSRC systems 20-1, 20-2, 20-3, etc., may apply a decreased confidence level in calculations implementing the host vehicle's position.

The host vehicle's 10 DSRC system 20 also communicates with a controller 64 within the host vehicle 10. The host vehicle 10 controller 64 determines whether the host vehicle's standard deviation is within an acceptable error level for the functions of the host vehicle. For example, the controller 64 may compare the host vehicle's standard deviation to a local usage threshold. For example only, the local usage threshold may be equal to 0.00001. While the local usage threshold may be 0.00001, the threshold may be customized for different urban environments or the different latitude, longitude, and elevation positions, among other things. Thus, the local usage threshold may be set to any threshold indicating that there are inaccuracies in the GNSS and/or GPS receiver 24, 28 data. A standard deviation that is greater than the local usage threshold may indicate that there are unacceptable inaccuracies in the GNSS and/or GPS receiver 24, 28 data such that the GNSS and/or GPS receiver 24, 28 data cannot be deemed accurate for specific local usage functions. A standard deviation less than or equal to the local usage threshold (i.e. not greater than the local usage threshold) may indicate that there are no inaccuracies, or acceptable inaccuracies, in the GNSS and/or GPS receiver 24, 28 data such that the GNSS and/or GPS receiver 24, 28 data can be trusted, or considered accurate, for specific local usage functions.

Based on the determination of whether the host vehicle's 10 GNSS and/or GPS receiver 24, 28 data is considered accurate, the controller 64 may adjust local safety applications to operate under degraded position accuracy conditions. If the host vehicle's 10 GNSS and/or GPS receiver 24, 28 data is considered accurate, the local safety applications (for example only, Forward Collision Warning—FCW—and Blind Spot Warning/Lane Change Warning—BSW/LCW) operate in normal mode. If the host vehicle's 10 GNSS and/or GPS receiver 24, 28 data is considered inaccurate or at an unacceptable level of degraded accuracy, the controller 64 may disable applications that require high position accuracy (for example, Forward Collision Warning—FCW—and Blind Spot Warning/Lane Change Warning—BSW/LCW— may require high accuracy positioning to work effectively and should be disabled if the position accuracy is not sufficient) to issue fewer false warnings or the controller 64 may reduce the confidence in any detected safety conditions and rely on additional safety sensors during the degraded position accuracy conditions.

Figure 3:
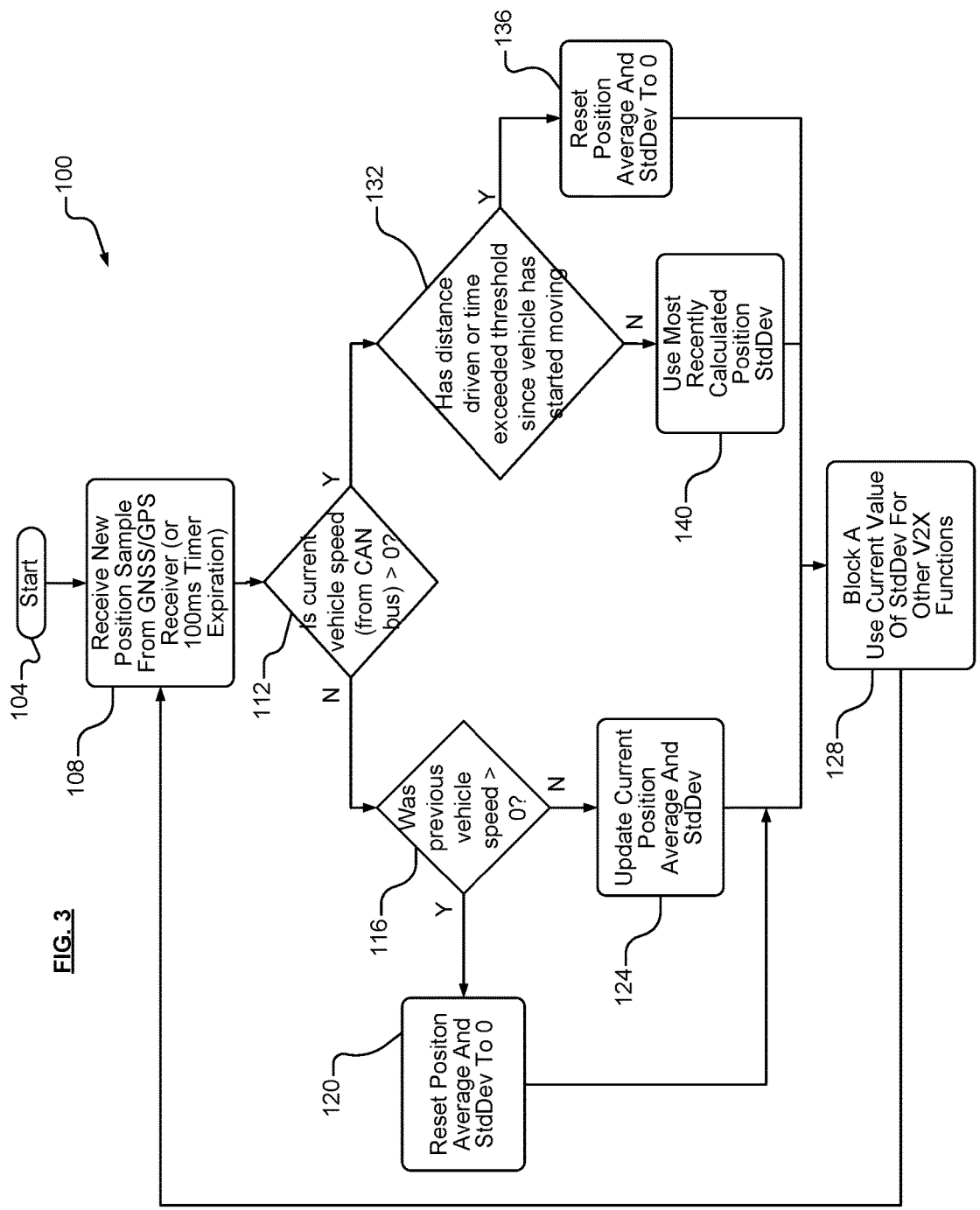
FIG. 3 illustrates a flow diagram for a method according to the present teachings for determining a standard deviation of a position of the vehicle.

Now referring to FIG. 3, a flowchart showing an example implementation of a method 100 for determining an inaccuracy of the GNSS and/or GPS receiver by determining a position standard deviation is shown. The method 100 for determining the inaccuracy of the GNSS and/or GPS receiver is based on the notion that if the vehicle is stopped and the position of the vehicle within the GNSS and/or GPS receiver is wandering or moving, then the accuracy of the GNSS and/or GPS receiver's position is poor. As such, there will be a high standard deviation between the position reported by the GNSS and/or GPS receiver and the actual position. The average position and standard deviation received by the GNSS and/or GPS receiver is determined for the position samples received during the time that the vehicle is stopped and then used as the GNSS and/or GPS receiver inaccuracy during the time when the vehicle is moving. The method 100 starts at 104.

At 108, the GNSS and GPS inaccuracy detection system 32 receives a new position sample from the GNSS and/or GPS receiver 24, 28. The GNSS and GPS inaccuracy detection system 32 may receive a new position update every 10 hertz (Hz) or 100 milliseconds (ms), but could receive a new position update at any rate. The GNSS and GPS inaccuracy detection system 32 receives a new position sample for a latitude, a longitude, and an elevation position at each new position update for the vehicle 10. The method 100 is applied for each new latitude, longitude, and elevation sample separately, and, thus, provides a new latitude average position and standard deviation, a new longitude average position and standard deviation, and a new elevation average position and standard deviation at each new position update for the vehicle 10.

At 112, the GNSS and GPS inaccuracy detection system 32 receives a current vehicle speed from the CAN 60 and determines whether the current vehicle speed is greater than zero (0). A current vehicle speed equal to zero (or not greater than zero) indicates that the vehicle is stopped (not moving), and a current vehicle speed greater than zero indicates that the vehicle is currently moving.

If the current vehicle speed is equal to zero (i.e., the vehicle is stopped), the GNSS and GPS inaccuracy detection system 32 determines whether a previous vehicle speed was greater than zero at 116. The GNSS and GPS inaccuracy detection system 32 receives current vehicle speed updates every 10 Hz or 100 ms, but may receive a new current vehicle speed at any rate. The GNSS and GPS inaccuracy detection system 32 stores each current vehicle speed received for use in the method 100 and as previous vehicle speeds. A previous vehicle speed equal to zero (or not greater than zero) indicates that the vehicle was previously stopped (not moving), and a previous vehicle speed greater than zero indicates that the vehicle was previously moving.

If the previous vehicle speed is greater than zero (the vehicle was previously moving) at 116, the GNSS and GPS inaccuracy detection system 32 resets an average position and a standard deviation to zero at 120. The average position is an average of all received vehicle position samples taken during the time when the vehicle 10 is stopped. The average position resets to zero each time the vehicle 10 stops after previously moving. The standard deviation is the square root of the mean of squared differences in the vehicle's position determined during the time when the vehicle 10 is stopped. The standard deviation, like the average position, resets to zero each time the vehicle 10 stops after previously moving.

If the previous vehicle speed is equal to zero (or not greater than zero; i.e., the vehicle was previously stopped) at 116, the GNSS and GPS inaccuracy detection system 32 updates the average position and standard deviation at 124. Again, the average position is an average of all received vehicle position samples taken during the time when the vehicle 10 is stopped. The standard deviation is the square root of the mean of squared differences in the vehicle's position determined during the time when the vehicle 10 is stopped. The average position and standard deviation reset to zero each time the vehicle 10 stops after previously moving. Thus, the updated average position and standard deviation at 124 is the average position and standard deviation of the vehicle since the vehicle has stopped. Further, the updated standard deviation determined at 124 is the inaccuracy of the GNSS and/or GPS receiver.

At 128, the average position and standard deviation determination unit 48 of the GNSS and GPS inaccuracy detection system 32 sends the standard deviation (i.e., the inaccuracy of the GNSS and/or GPS receiver) to the inaccuracy determination unit 56 of the GNSS and GPS inaccuracy detection system 32 for use in V2X functions. The use of the standard deviation in V2X functions is described in detail in relation to FIG. 4. If the average position and standard deviation was reset to zero at 120, the average position and standard deviation determination unit 48 sends the standard deviation as zero to the inaccuracy determination unit 56. If the GNSS and GPS inaccuracy detection system 32 updates the average position and standard deviation at 124, the average position and standard deviation determination unit 48 sends the most recently calculated standard deviation (i.e. the GNSS and/or GPS receiver inaccuracy) to the inaccuracy determination unit 56.

The method 100 then returns to 108 and the GNSS and GPS inaccuracy detection system 32 receives a new position sample from the GNSS and/or GPS receiver 24, 28.

If the current vehicle speed at 112 is greater than zero (i.e., the vehicle is moving), the GNSS and GPS inaccuracy detection system 32 determines whether the distance driven or time since the vehicle started moving exceeds a predetermined distance or time threshold at 132. For example only, the threshold for the distance driven may be within the range of 800 meters (m) to 0.5 miles, and the threshold for the time moving may be within the range of 60 seconds (s) to 2 minutes (min). While the thresholds for distance driven and time moving may be 800 m-0.5 miles and 60 s-2 min, respectively, the thresholds may be customized for different urban environments or different cities and may be set to any threshold indicating that the vehicle 10 may have left the urban environment. Further, the method 100 may utilize one or both of the distance and time thresholds to determine whether the vehicle 10 has left the urban environment.

If the distance driven or time moving exceeds the predetermined distance or time threshold, the GNSS and GPS inaccuracy detection system 32 resets the average position and standard deviation to zero at 136. As previously explained, the average position is an average of all received vehicle position samples taken during the time when the vehicle 10 is stopped. The average position resets to zero each time the vehicle 10 is driven for a distance and/or time greater than the distance and/or time threshold. The standard deviation is the square root of the mean of squared differences in the vehicle's position determined during the time when the vehicle 10 is stopped. However, the standard deviation, like the average position, resets to zero each time the vehicle 10 is driven for a distance and/or time greater than the distance and/or time threshold.

At 140, if the distance driven or time moving is less than or equal to (i.e., does not exceed) the predetermined distance or time threshold, the GNSS and GPS inaccuracy detection system 32 uses the most recently calculated average position and standard deviation as the inaccuracy of the GNSS and/or GPS receiver. Thus, the average position and the standard deviation for the time when the vehicle is stopped is used as the inaccuracy of the GNSS and/or GPS receiver during the time that the vehicle is moving (at 140), until the vehicle has driven for a threshold distance or threshold time. Then the average position and standard deviation are reset to zero (at 136).

At 128, the average position and standard deviation determination unit 48 sends the standard deviation (i.e., the inaccuracy of the GNSS and/or GPS receiver) to the inaccuracy determination unit 56 for use in V2X functions (further described with respect to FIG. 4). If the average position and standard deviation was reset to zero at 136, the average position and standard deviation determination unit 48 sends the standard deviation as zero to the inaccuracy determination unit 56, indicating that the data from the GNSS and/or GPS receiver is accurate. If the GNSS and GPS inaccuracy detection system 32 uses the most recently calculated average position and standard deviation at 140, the average position and standard deviation determination unit 48 sends the most recently calculated standard deviation (i.e. the GNSS and/or GPS receiver inaccuracy) to the inaccuracy determination unit 56.

The method 100 then returns to 108 and the GNSS and GPS inaccuracy detection system 32 receives a new position sample from the GNSS and/or GPS receiver 24, 28.

Now referring to FIG. 4, a flowchart showing an example implementation of a method 200 for using the GNSS and/or GPS inaccuracy in V2X functions. As previously stated, if the different vehicle systems using V2X functions are aware of inaccuracies in the GNSS and/or GPS receiver 24, 28 data, the vehicle systems may implement countermeasures such as disabling the system, relying on other sensors, and applying a decreased confidence level in calculations. The method 200 begins a 204 where the method 200 receives the standard deviation (or GNSS and/or GPS receiver inaccuracy) from the average position and standard deviation determination unit 48 in the method 100 (FIG. 3).

At 208, the inaccuracy determination unit 56 determines whether the host vehicle's (HV's) standard deviation received from the average position and standard deviation determination unit 48 (FIG. 3) is greater than a predetermined threshold. For example only, the predetermined standard deviation threshold may be equal to 0.00001. While the threshold for standard deviation may be 0.00001, the threshold may be customized for different urban environments or the different latitude, longitude, and elevation positions, among other things. Thus, the threshold for standard deviation may be set to any threshold indicating that there are inaccuracies in the GNSS and/or GPS receiver 24, 28 data. A standard deviation that is greater than the standard deviation threshold may indicate that there are inaccuracies in the GNSS and/or GPS receiver 24, 28 data, while a standard deviation less than or equal to the standard deviation threshold (i.e. not greater than the standard deviation threshold) may indicate that there are no inaccuracies in the GNSS and/or GPS receiver 24, 28 data.

If the HV standard deviation is greater than the predetermined threshold at 208, the host vehicle DSRC system 20 updates the position accuracy field in the BSM to indicate a degraded accuracy in the GNSS and/or GPS receiver 24, 28 data at 212. For example, the BSM may be updated using the following equation:

$$\text{DegradedAccuracyMeters} = \max(\text{PosAccuracy},(((\text{Pos}_{StdDev} - K_{StdDevThold})*C) + M))$$

where PosAccuracy is the position accuracy obtained directly from the positioning system via other conventional methods, Pos_StdDev is the HV standard deviation, K_StdDev_Thold is the standard deviation threshold, C is an accuracy degradation factor, and M is a minimum accuracy constant. While the constants C and M may change based on different applications, environments, or manufacture requirements, C may be equal to 150000 and M may be equal to 1, for example.

Once the BSM position accuracy field is updated, the next BSM is transmitted to remote vehicles (RVs) via V2X at a normal interval at 216. A normal interval for transmission of the BSM via V2X is at 10 Hz, but may be at any interval. If the HV standard deviation is less than or equal to the standard deviation threshold (i.e. not greater than the standard deviation threshold) at 208, the next BSM is transmitted to RVs via V2X at a normal interval at 216, without any update to the position accuracy field.

At 220, RVs process the BSM message transmitted via V2X at 216 and the RVs can adjust their usage of the HV's position accordingly. For example, the RVs may disable systems or functions relying on the HV's position, the RVs may rely on other sensors to determine the HV's position, and/or the RVs may apply a decreased confidence level in calculations implementing the HV's position.

At 224, the HV controller 64 determines whether the HV's standard deviation is greater than a local usage threshold. For example only, the local usage threshold may be equal to 0.00001. While the local usage threshold may be 0.00001, the threshold may be customized for different urban environments or the different latitude, longitude, and elevation positions, among other things. Thus, the local usage threshold may be set to any threshold indicating that there are inaccuracies in the GNSS and/or GPS receiver 24, 28 data. A standard deviation that is greater than the local usage threshold may indicate that there are inaccuracies in the GNSS and/or GPS receiver 24, 28 data, while a standard deviation less than or equal to the local usage threshold (i.e. not greater than the local usage threshold) may indicate that there are no inaccuracies in the GNSS and/or GPS receiver 24, 28 data.

If the HV's standard deviation is greater than the local usage threshold at 224, the HV controller 64 adjusts the local safety application to operate under degraded position accuracy conditions at 228. This may include disabling applications that require high position accuracy to issue fewer false warnings or reducing the confidence in any detected safety conditions and relying on additional safety sensors during the degraded position accuracy conditions. The method 200 then ends at 232.

If the HV's standard deviation is less than or equal to (i.e., not greater than) the local usage threshold at 224, all local safety applications operate in normal mode at 236. The method 200 then ends at 232.

Thus, the present disclosure provides a system and method for detecting when a vehicle's GNSS or GPS device is likely to be less accurate than desired, such as in the city or urban environment. The DSRC system 20 in the vehicle 10 can make use of this information and adapt the vehicle's 10 safety applications accordingly and advertise a degraded accuracy value to the surrounding DSRC systems 20. Improved safety can be achieved by ensuring that all V2X devices have an accurate understanding of the current GNSS and GPS accuracy in the given situation.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for detecting inaccuracies in a Global Network Satellite System receiver or a Global Positioning System receiver within a vehicle, the system comprising:

the global network satellite system receiver or the global positioning system receiver for receiving a signal from a global network satellite system or a global positioning system indicating a current position of the vehicle;

a global network satellite system and global positioning system inaccuracy detector configured to receive the current position of the vehicle from the global network satellite system receiver or the global positioning system receiver, determine an average position and a standard deviation for a position of the vehicle, determine whether the standard deviation for the position is greater than a first threshold, and, if greater than the first threshold, determine whether the standard deviation for the position is greater than a second threshold; and a vehicle controller configured to control vehicle operations, wherein if the standard deviation for the position is greater than the first threshold, the vehicle controller broadcasts a degraded position accuracy to any remote vehicle within range and continues operating the vehicle under normal conditions, and if the standard deviation for the position is greater than the second threshold, the vehicle controller adjusts local safety applications to operate under degraded position accuracy conditions.

2. The system of claim 1, wherein the global network satellite system and global positioning system inaccuracy detector is configured to receive signals from the global network satellite system receiver or the global positioning system receiver and a control area network of the vehicle and determine the current position of the vehicle and the current speed of the vehicle from the signals.

3. The system of claim 1, further comprising a dedicated short range communication system on the vehicle in communication with the global network satellite system and global positioning system inaccuracy detector that updates a basic safety message broadcast to the remote vehicle if the standard deviation for the position is greater than a standard deviation threshold.

4. The system of claim 3, wherein the dedicated short range communication system on the vehicle communicates with a dedicated short range communication system of the remote vehicle to transmit the basic safety message having an updated position accuracy field.

5. The system of claim 1, wherein a dedicated short range communication system on the vehicle communicates with the global network satellite system and global positioning system inaccuracy detector and the vehicle controller to indicate when the standard deviation of the position is greater than the second threshold.

6. The system of claim 5, wherein the vehicle controller disables applications identified as requiring high position accuracy, reduces a confidence value, or activates safety sensors when the standard deviation of the position is greater than the second threshold.

7. A method for detecting inaccuracies in a global network satellite system receiver or a global positioning system receiver, the method comprising:

determining, with a global network satellite system and global positioning system inaccuracy detector, an average position and a standard deviation for a position of a vehicle;

determining, with the global network satellite system and global positioning system inaccuracy detector, whether the standard deviation for the position is greater than a first threshold;

determining with the global network satellite system and global positioning system inaccuracy detector, whether the standard deviation for the position is greater than a second threshold if the standard deviation for the position is greater than the first threshold;

continuing normal operation of the vehicle and broadcasting the degraded position accuracy to any remote vehicle within range if the standard deviation for the position is greater than the first threshold; and adjusting local safety application to operate under degraded accuracy conditions if the standard deviation for the position is greater than the second threshold.

8. The method of claim 7, further comprising determining, with the global network satellite system and global positioning system inaccuracy detector, a current speed and a current latitude, longitude, and elevation position of the vehicle, wherein the current latitude, longitude, and elevation positions are determined based on signals received from the global positioning system receiver or the global network satellite systems receiver.

9. The method of claim 8, further comprising determining the current speed of the vehicle based on a signal received from a control area network in the vehicle.

10. The method of claim 8, further comprising determining, by the global network satellite system and global positioning system inaccuracy detector, whether the vehicle is moving based on whether the current speed of the vehicle is greater than zero.

11. The method of claim 7, further comprising determining, by the global network satellite system and global positioning system inaccuracy detector, whether a previous vehicle speed is greater than zero.

12. The method of claim 11, further comprising resetting, with the global network satellite system and global positioning system inaccuracy detector, the average position and standard deviation of the position to zero if the previous vehicle speed is greater than zero.

13. The method of claim 11, further comprising determining, with the global network satellite system and global positioning system inaccuracy detector, an updated average position and standard deviation of the position using a current vehicle speed and a current vehicle position if the previous vehicle speed is not greater than zero.

14. The method of claim 7, further comprising determining, with the global network satellite system and global positioning system inaccuracy detector, whether the vehicle is in an urban environment based on a distance driven or time driven since the vehicle was last stopped.

15. The method of claim 14, further comprising resetting, with the global network satellite system and global positioning system inaccuracy detector, the average position and standard deviation of the position to zero if the vehicle is in the urban environment.

16. The method of claim 7, further comprising determining, with a dedicated short range communication system, an updated position accuracy field if the standard deviation for the position is greater than the first threshold.

17. The method of claim 16, further comprising transmitting, with a dedicated short range communication system, a basic safety message having a current position of the vehicle, a current speed of the vehicle, and the updated position accuracy field to a dedicated short range communication system of the remote vehicle.

18. The method of claim 17, further comprising adjusting, by the remote vehicle, a usage of the current position and the current speed of the vehicle based on the updated position accuracy field.

19. The method of claim 7, wherein the second threshold is 0.00001.

20. The method of claim 7, further comprising disabling applications identified as requiring high position accuracy, reducing a confidence level, or activating safety sensors if the standard deviation of the position is greater than the second threshold.

* * * * *